United States Patent
Rios et al.

(10) Patent No.: US 11,913,848 B2
(45) Date of Patent: Feb. 27, 2024

(54) SENSOR ASSEMBLY FOR DETERMINING A PHYSICAL PROPERTY OF A VEHICLE INCLUDING A LOCKING ARRANGEMENT AND FIRST AND SECOND CONTROLLABLE SWITCHES

(71) Applicant: Meggitt SA, Fribourg (CH)

(72) Inventors: Gustavo Rodrigo Rios, Villars-sur-Glâne (CH); Raphaël Goutagny, Bern (CH); Stéphane Benoit, Boveresse (CH); Samuel Giossi, Fribourg (CH)

(73) Assignee: MEGGITT SA (CH)

( * ) Notice: Subject to any disclaimer, the term of this patent is extended or adjusted under 35 U.S.C. 154(b) by 239 days.

(21) Appl. No.: 17/426,688

(22) PCT Filed: Feb. 14, 2020

(86) PCT No.: PCT/EP2020/053996
§ 371 (c)(1),
(2) Date: Jul. 29, 2021

(87) PCT Pub. No.: WO2020/165451
PCT Pub. Date: Aug. 20, 2020

(65) Prior Publication Data
US 2022/0107235 A1 Apr. 7, 2022

(30) Foreign Application Priority Data
Feb. 14, 2019 (EP) ..................................... 19157141

(51) Int. Cl.
*G01L 17/00* (2006.01)
*B60C 23/04* (2006.01)
(Continued)

(52) U.S. Cl.
CPC .......... *G01L 17/00* (2013.01); *B60C 23/0479* (2013.01); *B60C 23/0496* (2013.01); *G01L 19/086* (2013.01); *G01L 19/14* (2013.01)

(58) Field of Classification Search
None
See application file for complete search history.

(56) References Cited

U.S. PATENT DOCUMENTS

| | | | |
|---|---|---|---|
| 7,458,256 B1 | 12/2008 | Lin | .............................. 73/146.8 |
| 7,589,620 B2 | 9/2009 | Pradier et al. | ................. 340/448 |

(Continued)

FOREIGN PATENT DOCUMENTS

| | | |
|---|---|---|
| CN | 102549404 A | 7/2012 |
| DE | 10 2012 200 267 A1 | 7/2013 |

(Continued)

OTHER PUBLICATIONS

International Search Report dated May 12, 2020 in corresponding PCT International Application No. PCT/EP2020/053996.
(Continued)

*Primary Examiner* — Peter J Macchiarolo
*Assistant Examiner* — Jermaine L Jenkins
(74) *Attorney, Agent, or Firm* — OSTROLENK FABER LLP

(57) ABSTRACT

A sensor assembly providing a physical property of a vehicle, e.g. tire pressure of a wheel of an aircraft, comprises electronic circuitry including a locking arrangement and sensor suited to sense the physical property and an exhaustable power source, e.g. a battery. For prolonged shelf life, a first and a second switch are functionally arranged between power source and circuitry. The second switch is controlled by the locking arrangement, whereas the first switch is controllable from outside the sensor assembly, e.g. by a magnetic field. The first switch is arranged to switch the (Continued)

power to the electronic circuitry, whereby the locking arrangement is powered, too. In consequence, the locking arrangement is capable to close the second switch. Thereafter, a further stimulus to the first switch will no more be capable to switch the sensor off, unless the locking arrangement enables it again by opening the second switch.

26 Claims, 6 Drawing Sheets

(51) Int. Cl.
  *G01L 19/08* (2006.01)
  *G01L 19/14* (2006.01)

(56) References Cited

U.S. PATENT DOCUMENTS

| | | | | |
|---|---|---|---|---|
| 8,564,429 | B2* | 10/2013 | Zhou | B60C 23/007 340/447 |
| 10,035,387 | B2* | 7/2018 | Carresjö | B60C 23/0474 |
| 2007/0193348 | A1 | 8/2007 | Rutherford et al. | 73/146.8 |
| 2008/0284576 | A1 | 11/2008 | Zhou | 340/442 |
| 2017/0250633 | A1 | 8/2017 | Moiraghi et al. | |
| 2018/0345742 | A1 | 12/2018 | Huang et al. | |

FOREIGN PATENT DOCUMENTS

| | | |
|---|---|---|
| EP | 1 942 018 A1 | 7/2008 |
| EP | 2 465 712 A1 | 6/2012 |
| JP | H06-210005 A | 8/1994 |
| JP | 2007-145322 A | 6/2007 |
| JP | 2013-065159 A | 4/2013 |
| WO | WO 2006/043236 A2 | 4/2006 |
| WO | WO 2013/090008 A1 | 6/2013 |
| WO | WO 2013/152294 A1 | 10/2013 |

OTHER PUBLICATIONS

Written Opinion dated May 12, 2020 in corresponding PCT International Application No. PCT/EP2020/053996.

* cited by examiner

SENSOR ASSEMBLY FOR DETERMINING A PHYSICAL PROPERTY OF A VEHICLE INCLUDING A LOCKING ARRANGEMENT AND FIRST AND SECOND CONTROLLABLE SWITCHES

CROSS-REFERENCE TO RELATED APPLICATIONS

The present application is a 35 U.S.C. §§ 371 national phase conversion of PCT/EP2020/053996, filed Feb. 14, 2020, which claims priority to European Patent Application No. 19157141.3, filed Feb. 14, 2019, the contents of which are incorporated herein by reference. The PCT International Application was published in the English language.

TECHNICAL FIELD

The present invention relates to a sensor assembly for determining a physical property of a vehicle, preferably an aircraft.

BACKGROUND OF THE INVENTION

Traditionally, measuring a parameter on an aircraft like tire pressure is performed by some equipment fitted to the aircraft. It is either permanently fitted to the aircraft (such as the pressure sensor of a tire pressure measurement system [TPMS]) or temporarily fitted to the aircraft for the duration of the measurement (such as a pressure gauge used for tire pressure checks). All parameters used in the processing are either pre-set constants or measurements from devices present permanently or temporarily on the aircraft.

Some existing products already use a device external to the aircraft for measuring vehicle parameters. One example is described in patent WO-A-2013/090008. However these products use a bespoke, application-specific piece of a kit (often called "hand-held device"). This device is an integral part of the product. It is provided by the product manufacturer. The product cannot be used without this device and the device has no other use than the one of the product. This extra piece is a burden to users. It may get lost or damaged, thus preventing the entire product from being used.

Known aircraft tire pressure measurement systems comprise pressure sensor devices (PSD) which are either installed on a dedicated port on the wheel ("pressure port" different from the "inflation port"), or installed on the "inflation port" (i.e. inflation valve) hence preventing the tire from being re-inflated (the equipment must be removed in order to connect an inflation means).

In the aerospace industry, equipment may be stored several years before being installed on aircraft. Minimizing the power consumption of the PSD during the storage period is critical to ensure that the contractual service life of the PSD is ensured once installed on an aircraft.

In the prior art, powering-up battery-powered device requires specific equipment and conditions. For example in patents EP 2 465 712 A1 or US 2017/0250633 A1, the device is activated when subjected to a certain pressure or by reception of an activation signal.

Activation by pressure is constraining because checking the proper operation of the device requires subjecting it to pressure, which is not convenient for goods-in control (i.e. quick check of the device at delivery). Moreover it means that a specific stimulus is required to activate the device, whereas in the present invention the absence of a stimulus activates the device. This makes the present invention more robust.

Activation by reception of an activation signal requires specific equipment. This is not desirable because this specific equipment may not be available.

SUMMARY OF THE INVENTION

Therefore, it is an object of the present invention to propose a sensor of a physical property of a vehicle, in particular the tire pressure of an aircraft, wherein the power source of the sensor can be safely and easily switched on at least in order to increase shelf life.

Further objects aimed at by preferred embodiments are:
Complying with safety requirements for aircraft with regard to switching on the sensor.

The first object is attained by the sensor defined in claim 1. The further claims present preferred embodiments of the sensor and method using the sensor.

Accordingly, the sensor is equipped with a primary switch which can be operated by a magnetic field. More specifically, the primary switch is arranged to be open, i.e. the electric circuit is interrupted, when the magnetic field strength is above the switching threshold. Furthermore, the primary switch is connected in parallel to a locking circuitry comprising a secondary switch which is initially open, yet closes once at least the primary switch has closed and the locking conditions are met. Once the primary switch closes due to a change in a magnetic field applied to the primary switch, the locking circuitry is powered on. Once the locking arrangement is active, possibly depending on further conditions, it switches on the second switch. As the second switch is effectively connected in parallel to the first switch so the latter is shortcut. As a consequence, the switched-on state is maintained independently of if the primary switch changes its state, f. i. if the magnetic field raises above the switching threshold again.

Actual sensor elements are mostly not capable to switch on and off considerable load like the sensor device's circuitry. Furthermore, real life sensors may have a switching characteristic inverse or different to the one required. Hence, according to preferred aspect, primary as well as secondary switch may be understood to comprise the actual sensor/ input element and further components for switching higher powers (most importantly: currents) and to inverse and/or to improve the switching characteristic. As a consequence, in a preferred variant, the power portion, e.g. the switch means actually connecting and disconnecting the power supply from the sensor device's circuitry, of primary and secondary switch may be a common part of primary and secondary switch. In other terms, according to this variant, primary and secondary switch comprise each a control portion and a power portion, the power portion (e.g. a power transistor) being common to both switches, and the two control portion being connected to the common power portion the way that the required overall behaviour is achieved. The logical equivalent is in part an OR-link of the outputs of the control portions, with the output of the OR link being the control input of the (common) power portion. The condition that the secondary switch can only inhibit switching off, yet is not able to switch on the power supply, may be achieved by the fact, that the control portion of the second switch is only powered-on once the primary switch has closed. In contrast, the primary switch is permanently active and as required connected to the power source, preferably only its parts actually necessary to be able to respond to the externally applied field or other stimulus. In the powerless state, the secondary switch is unable to produce a logical true level to the OR link, hence is not capable to incite the power portion to connect the power supply to the sensor device's circuitry.

Regarding a preferably targeted property of an aircraft: the relative tire pressure, the sensor may therefore have a sealed layout, i.e. only a sensing access for the tire pressure. Therefore, it is highly insensitive to detrimental or irritating environmental influences, in particular dirt and fluids.

Preferably, the present invention relates to a wireless, battery-powered device used as a sensor on an aircraft. In order to be robust to the environment, the device, once installed on aircraft, is fully hermetic. Any opening, buttons, connectors or any of the like through the housing would compromise the robustness of the device. Therefore the device housing does not feature any mechanical means to power the device on or off.

However, it is useful to turn the device off when not in use (e.g. during storage prior to installation on aircraft) in order or increase its service life (the device being powered by a battery). The present invention describes a novel means to put the device in an ultra-low-power mode, typically for storage, without compromising the robustness of the device housing and without requiring a bespoke tool to power on the device.

The present invention does not require any specific equipment to activate or de-activate the device. This is important because the first application of the present invention is in business aviation. Business aircraft can land in remote airfields where very little equipment is available. The same applies to commercial aviation as logistics to have a bespoke device at each location is complex and expensive.

A simple, small, light, inexpensive and commonly available magnet is sufficient to de-activate the device if located and oriented reasonable precisely. Such a magnet may be included in the packaging of the device. Moreover, the magnet is used to de-activate the device. The absence of a magnet leads to the device being activated, therefore no equipment at all is required to activate the device. This makes usage convenient even in remote location where specific equipment is not available.

Another aspect of use of the sensor is the existence of PEDs as evaluation device which are provided with at least the capability to wirelessly communicate with sensors of a vehicle, preferably also via a network (e.g. the internet) with remote databases or sensors, and computing capabilities so that the PED can question a sensor for its value and compute a property of the vehicle based on a 1st parameter which is the value measured by the sensor, and one or more 2nd parameters obtained from another source, be it a sensor of the vehicle, a built-in sensor of the PED, some other sensor with which the PED can communicate, a parameter measured in a remote location, or a value retrieved from a remote data source like a data base or a data provider. E.g. the actual relative tire pressure may be determined based on the absolute pressure value provided by a tire pressure sensor and the local atmospheric pressure. The latter may be determined by a sensor integrated in the PED (or a sensor attached to it), a sensor provided by the aircraft, or a meteorological service provider.

Generally, "communicating", in particular with a remote data furnishing installation like a remote server, is intended to mean any transmission, even unidirectional, of information. It includes even obtaining data which need further processing by the PED, like data obtained from satellites of a GNSS.

A benefit is to use preferably a PED (portable electronic device, preferably one in common use as a daily personal accessory, e.g. a smartphone) provided by the user. The user already owns and carries the PED with him. Therefore there is no extra piece of kit required. Moreover, there are no development and manufacturing costs associated with an extra piece of kit, hence reducing the price of the system.

BRIEF DESCRIPTION OF THE DRAWINGS

The invention will be explained more in detail by means of preferred exemplary embodiments example with reference to the Figures:

FIG. 12: Scheme of the sensor when being activated ("out of storage mode"): The device is removed from its packaging, hence it is away from the magnet 73. The reed switch 76 has changed its state. This leads to the magnetic switch circuitry 75 being closed. No matter the state of the lock-on circuit 77, the device is turned on.

DESCRIPTION OF PREFERRED EMBODIMENTS

Figure 1:
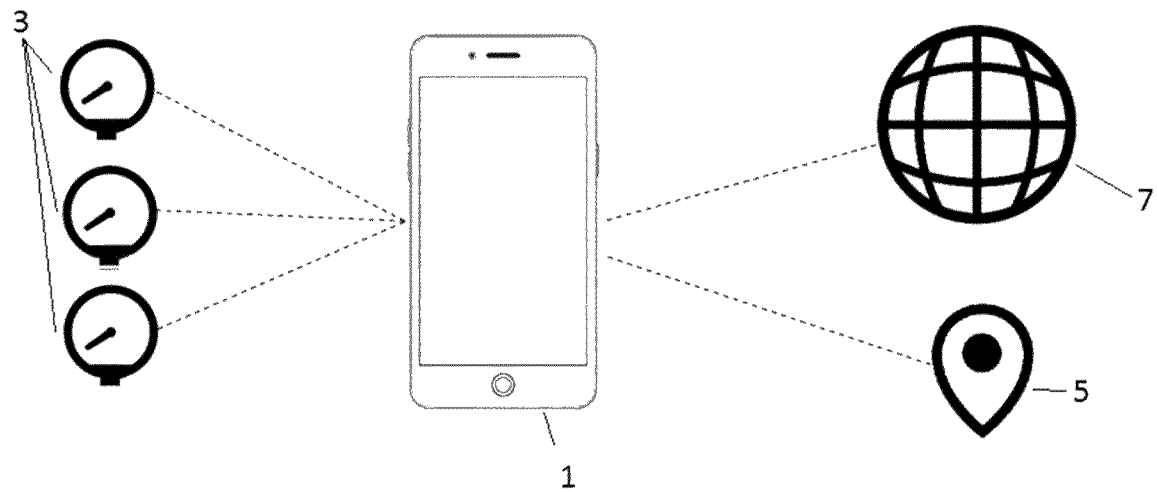
FIG. 1 Overview of the interface between the items potentially taking part in the invention: The PED 1 can communicate with equipment 3 fitted on the aircraft, can use its own sensing capabilities 5 and can fetch data on or via the internet 7.
Figure 2:
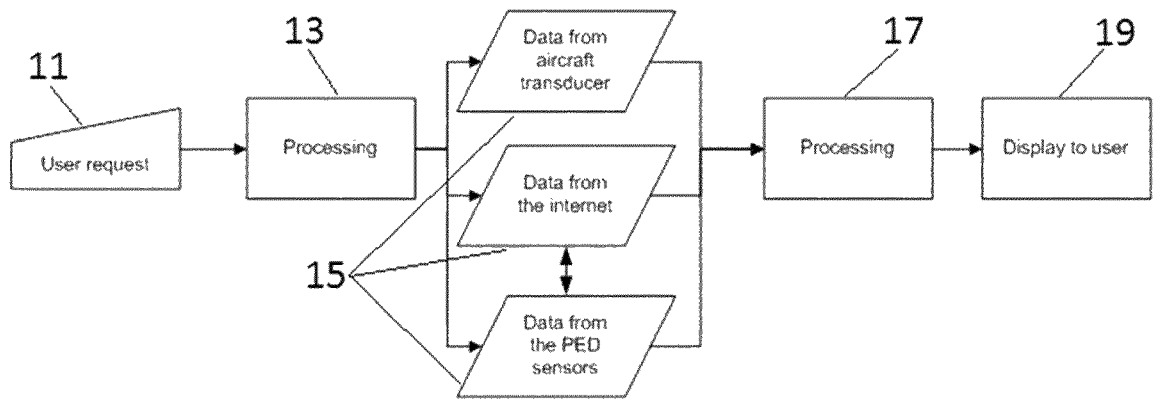
FIG. 2 Generic flowchart of the method: It shows the flow of data and actions taking place in the invention. It starts with a request 11 from the user (or from an automatic requesting system). The request undergoes processing 13 and generates the gathering of data from all required sources 15. These data 15 are processed 17 and finally displayed 19 to the user (and/or transmitted to an automatic system).
Figure 3:
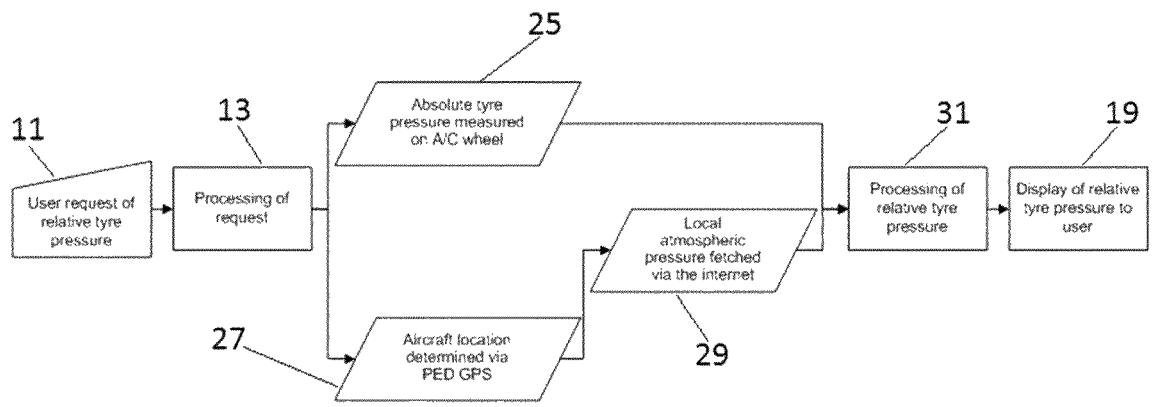
FIG. 3 Flowchart of an embodiment using current local parameters: The user requests 11 a relative tire pressure, but the measurement system on the wheel can only conveniently measure an absolute pressure 25. In order to convert it to a relative pressure, after pre-processing 13 the request, the sensing and communicating capabilities of PED 1 (for instance by accessing a GNSS) are used to determine the location of the aircraft. Once the location is known, the PED 1 looks for the atmospheric pressure 29 at aircraft location on the internet. Based on these data, the relative tire pressure 31 is computed and provided to the user, e.g. displayed 19.
Figure 4:
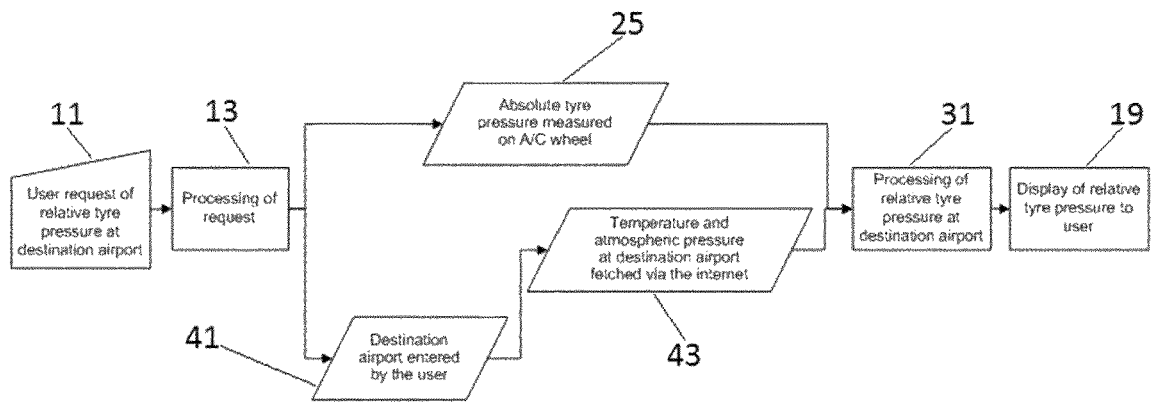
FIG. 4 Flowchart of an embodiment involving anticipation of a future condition, i.e. of a place where the vehicle is planned to go: The user requests 11 the relative tire pressure at its destination airport. The measurement system on the wheel can only conveniently measure an absolute pressure 25. In order to convert it to a relative pressure, after the processing 13, the user types in 41 its destination on the PED 1. The PED 1 looks 43 for the atmospheric pressure at aircraft destination on the internet. Based on these data, the future relative tire pressure at destination is computed 31 and provided 19 to the user.

An aspect of measuring the tire pressure is the use of parameters (such as local temperature, atmospheric pressure or elevation at current or future location) from sources external to the aircraft (such as atmospheric pressure from local weather service accessible via the internet, a database on a remote server accessible via the internet or a geographical position based on a Global Navigation Satellite System (e.g. Global Positioning System (GPS), Galileo, etc.) access capability of a portable electronic device (PED 1).

One or several physical parameter(s) 3 are measured on aircraft by means of some aircraft equipment or maintenance equipment. The measured values are transmitted to a PED 1 (such as a smartphone or tablet) for processing and display. The processing involves parameters from sources external to the aircraft (such as—but not limited to—the atmospheric pressure measured by the PED integral pressure sensor 5, the elevation from the PED 1 GNSS or the temperature from a meteorological website accessed via the PED 1 internet connection 7). The outcome is a processed parameter value.

The present invention complements the traditional measurement techniques in order to provide the user with a more accurate, more meaningful or more directly applicable value.

The present invention uses the capabilities of a PED 1 to use parameters from sources 5, 7 that are not fitted to the aircraft, neither permanently nor temporarily. This includes the sensors of the PED 1 itself (such as GNSS) and the data available via the internet (such as meteorological data).

The present invention finds its roots in the generalization of PED 1 in the aircraft maintenance industry as well as in daily life. It is made possible by the development and integration of aircraft-compliant wireless transmission capabilities.

The aim of the present invention is to simplify and improve measurement and processing of aircraft parameters. It is made possible by incorporating a PED 1 in the parameter measurement and processing chain. The PED 1 is not just a display or a processing means. The PED 1 is assumed to be connected to the internet 7, and may even have embedded sensing capabilities 5 (such as GNSS for geographical position sensing). The internet connection may be used for accessing data on the public internet or on a private database.

The benefits of using data from sources external to the aircraft are manifold:
Some parameters can be measured by sensors not belonging to the aircraft.
This reduces the equipment fitted to the aircraft (making the aircraft lighter and more reliable)
The processing can use parameters not conveniently accessible to a particular aircraft system (such as a ground-based databases or a specific physical parameter not conveniently measurable at the system location).
The processing can use parameters (such as meteorological data) of a future location (such as the destination airport), rather than of the current aircraft location. This allows anticipating the future condition of an aircraft parameter. The aircraft configuration can therefore be optimised taking into account the various conditions it will face during one or several days of operations, enabling to reduce maintenance costs. For example, an optimised tire pressure reduces the wear of the tire and extends its life.

Figure 5:
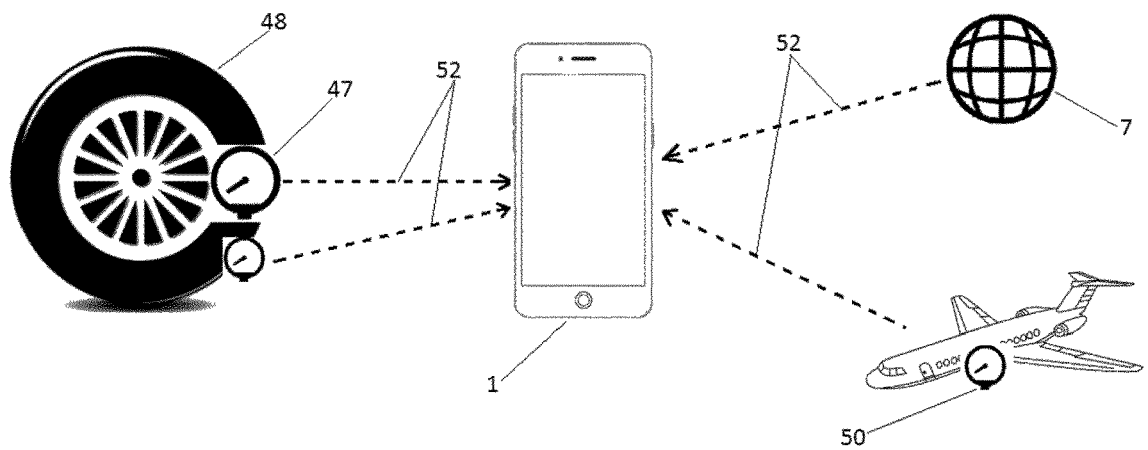
FIG. 5 Scheme of an example of determining the tire pressure of an aircraft: A pressure sensor 47, fitted on a wheel 48, measures the absolute tire pressure. The surrounding atmospheric pressure is required in order to provide a relative tire pressure to the user. The surrounding atmospheric pressure can be measured in three different ways. Option 1 is a measurement on the wheel-mounted pressure sensor 47. Option 2 is an additional sensor 50 installed somewhere else on the aircraft. Option 3 is the use of a measurement performed by an external, unrelated means made available on the internet 7. All measurements are transmitted wirelessly 52 to a PED 1.

A good example of the present invention is an aircraft tire pressure measurement system (TPMS) as shown in FIG. 5. A sensor 47 fitted on an aircraft wheel 48 measures the tire pressure and wirelessly 52 transmits the result to a PED 1. System users typically want to read the relative pressure of a tire (i.e. difference between the tire pressure and the surrounding atmospheric pressure) rather than the absolute pressure (i.e. difference between the tire pressure and the vacuum) because this is what is mentioned in the aircraft maintenance documents. This means that the system has to measure both the tire pressure and the surrounding atmospheric pressure. The variations of the surrounding atmospheric pressure (due to the temperature and altitude) have a non-negligible impact on the relative tire pressure.

The atmospheric pressure can be measured in several ways:
1. The atmospheric pressure can be measured by the sensor 47 fitted on the tire. This requires a gas inlet hole, so that the sensor is connected to the atmospheric pressure. Due to the very dirty environment this sensor is in (water, mud, brake dust, cleaning fluids, de-icing fluids, insects, etc), the inlet hole is very likely to get blocked. There is no effective and reliable way to prevent this over time. This may lead to an erroneous pressure measurement and hence endangers the safety of the aircraft operation. This is not a desirable solution.
2. The atmospheric pressure can be measured by an additional sensor 50 fitted in a less constraining area of the aircraft. It would transmit its measurement wirelessly to the PED 1 just like the sensor fitted on the wheel 48. This requires an extra sensor. An extra item means higher costs, higher weight and lower overall reliability. This is not an ideal solution. Furthermore, this solution does not allow anticipating the differential pressure conditions the tire will encounter at the aircraft destination.
3. The atmospheric pressure can be measured by an unrelated sensor, e.g. a sensor of the local weather service. This data may be available on the internet 7. The PED 1 can access this data via its internet connection 52. It does not require any extra equipment on the aircraft nor for the user. The atmospheric pressure is measured by sensors that are already present and operating in the surroundings. The data is already available and is just waiting to be used. This solution is better in terms of aircraft weight, aircraft system reliability and cost. This is a good example of the benefits of the present invention.

Tire Pressure Measurement Device

A preferred tire pressure measurement device (wireless tire pressure gauge, WTPG) comprises a pressure sensor device (PSD) 47 and a pressure sensor holder (PSH) 57. The PSD 47 contains a pressure transducer 83 and some electronics 79. The PSH 57 is a mechanical interface allowing installing the PSH 57 on an aircraft wheel 48.

The PSH 57 fulfils the following functions:
Maintain the PSD 47 in place on the tire inflation port
Connect the tire gas pressure 60 to the pressure transducer
Provide a means to inflate/deflate the tire 48 with the PSD 47 in place
Allow the PSD 47 replacement with the tire 48 inflated The combination of these four functions allows installing the PSD 47 on the tire inflation valve in a convenient way.

The present invention allows fitting the pressure measurement device on the inflation port of the aircraft wheel 48 whilst providing a standard interface for inflating the tire. This allows equipping aircraft whose wheels do not have a separate "pressure port", without impairing maintenance. It also allows replacing the PSD 47 without deflating the tire. This is required because the PSD 47 is a battery-powered device that needs to be replaced periodically.

The PSD 47 being a battery-powered device, it needs to minimize its power consumption. It must do so in service but also during storage. In the aerospace industry, equipment can be stored for several years before being installed on aircraft. Minimizing the PSD 47 power consumption during the storage period is critical to ensure that the contractual service life of the PSD 47 once installed on aircraft is ensured.

Due to the very harsh environment the PSD 47 is subjected to once installed on an aircraft (mounted on a landing gear wheel, subjected to shocks, water, mud, dust, insects, corrosive fluids, centrifugal accelerations, etc.), it is not convenient to have an on/off switch on the PSD external enclosure 85. The enclosure 85 must remain perfectly hermetic. Therefore a contactless switch has been developed. It uses a reed switch 76 that opens or closes (depending whether it is normally closed or normally open) when subjected to an appropriate magnetic field (e.g. by approaching a magnet). This allows activating the PSD 47 through the PSD enclosure 85 without compromising the hermeticity and the robustness of the enclosure 85. A novelty resides in the "lock-on" function once the PSD 47 is turned on. In order to prevent spurious switch-offs in service due to reed switch malfunction (caused by vibrations, shocks, high centrifugal accelerations, etc.), the PSD 47 can be locked in the on state by software.

Embodiment: Two Valves in Series

This solution contains 2 valves 59, 63 in series. Inner valve 59 is located between the tire 48 and the PSD 47. Outer valve 63 is located between the PSD 47 and the inflation interface 87. Inner valve 59 allows removing the PSD 47 without deflating the tire 48. Outer valve 63 allows plugging the usual inflation means. Inner valve 59 is contained into the first element of the PSH 57, called Wheel-Sensor Interface (WSI) 55. Outer valve 63 is contained in the second element of the PSH 57, called retaining nut 61. Both valves 59, 63 contain a standard aircraft wheel valve core. They are normally closed (and maintained as such by a spring 89, 91). They open when the stem 93, 95 is pushed.

Figure 6:
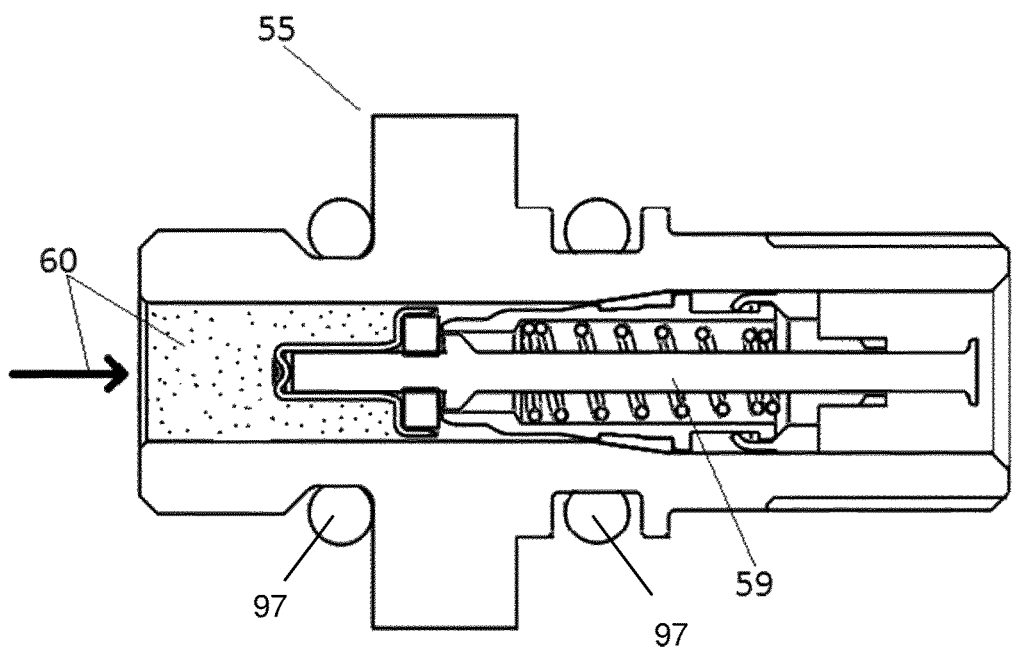
FIG. 6 Longitudinal section through the WSI 55, a part of the PSH 57: The WSI 55 is shown on its own, without any PSD or retaining nut fitted. The inner valve 59 is therefore closed and the tire pressure 60 is contained within the WSI 55. This is a gastight configuration.
Figure 7:
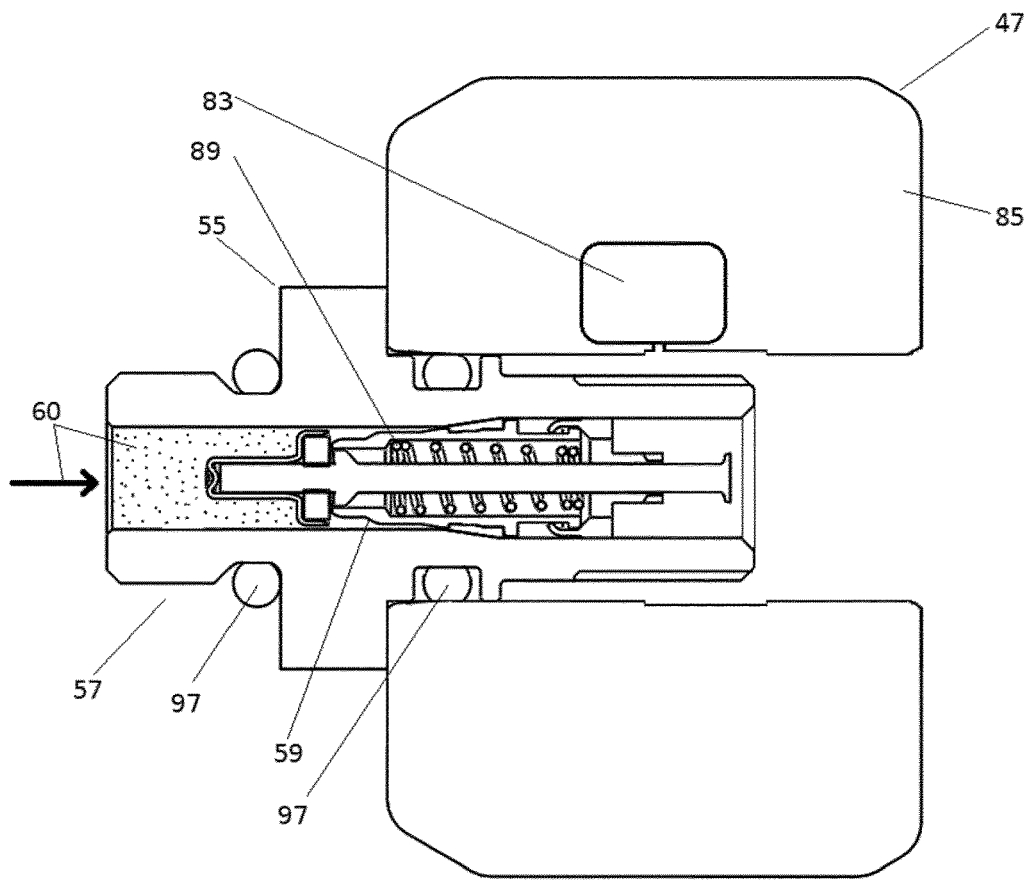
FIG. 7 As FIG. 6, with pressure sensor PSD 47 mounted on the valve body: It shows the WSI 55 with a PSD 47. Since a retaining nut is not fitted, inner valve 59 is still closed. This is a gastight configuration, too.
Figure 8:
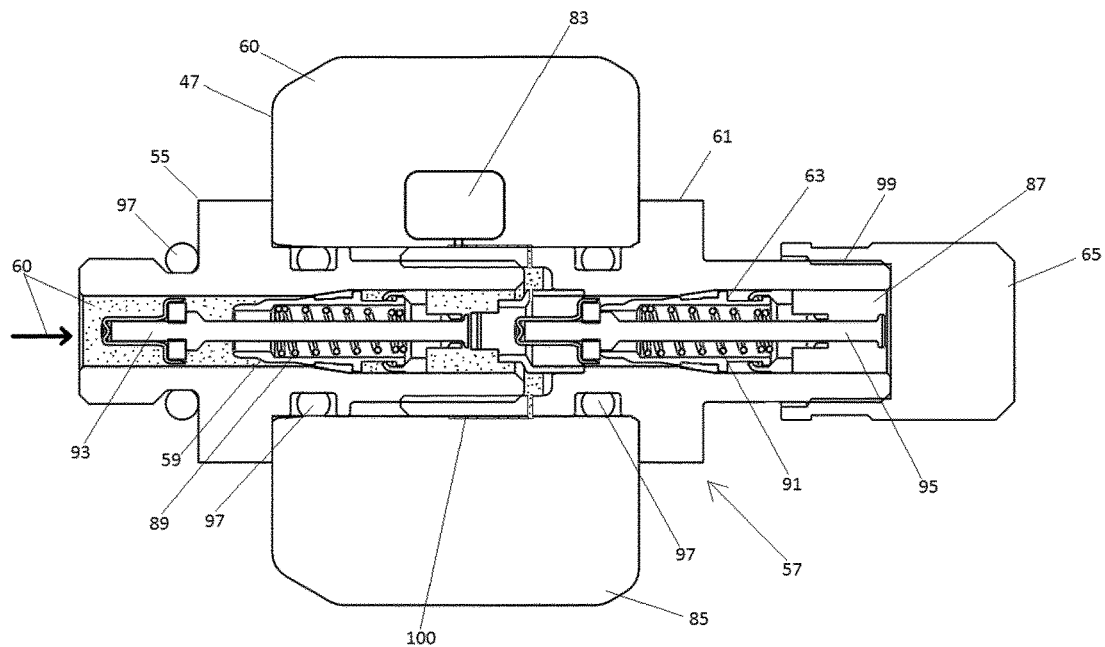
FIG. 8 As FIG. 7 with the retaining nut 61 attached to the WSI 55: Since the retaining nut 61 is fitted, inner valve 59 is open and the PSD 47 is subjected to tire pressure 60. Outer valve 63 is closed, hence the tire pressure is contained within the WSI 55 and PSD 47. This is a gastight configuration. A valve cap 65 is fitted on the retaining nut 61. The valve cap 65 is a protection against ingress of contaminants.
Figure 9:
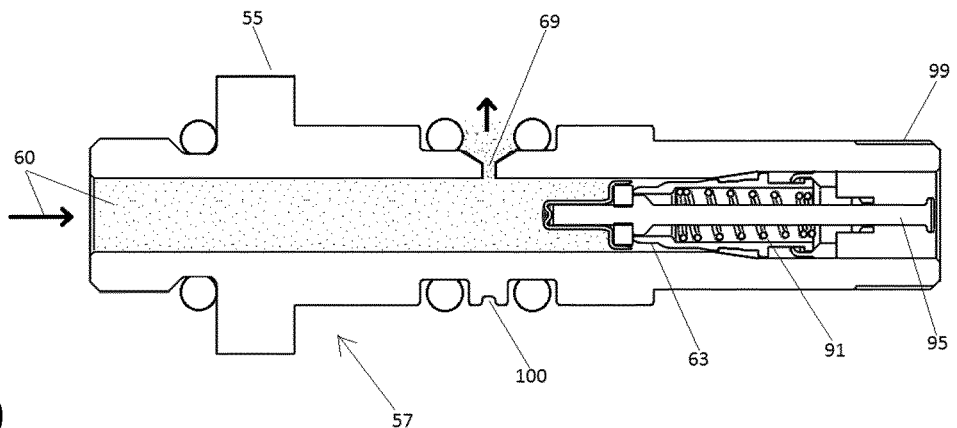
FIG. 9 As FIG. 6, yet the WSI 55 is provided with an access passage 69 for pressurized gas 60 of the tire: The WSI 55 is shown on its own, without any PSD 47 or retaining nut fitted. There is only one valve 63 in this version, the valve 63 corresponding to the outer valve 63 in FIG. 6-8. The tire pressure 60 leaks to the atmosphere because no PSD 47 is fitted. Due to the small diameter of the outlet 69, the gas flow is small and the tire deflation is slow. This leaves enough time to replace the PSD 47.
Figure 10:
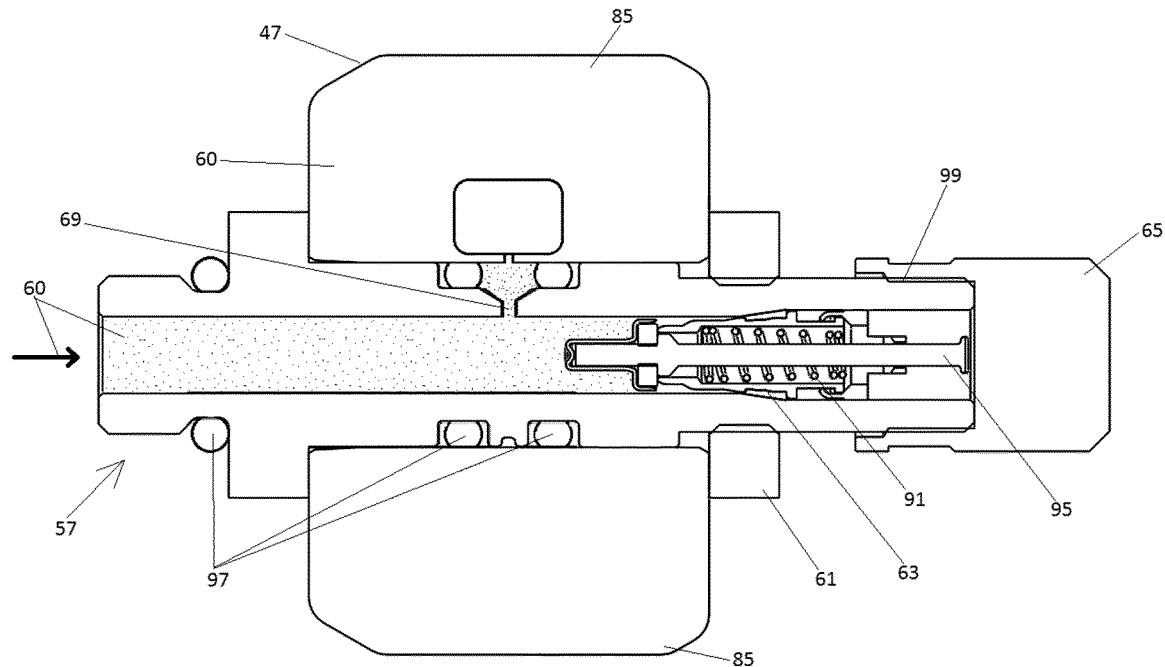
FIG. 10 As FIG. 9, with a PSD 47 fitted to the WSI 55: The tire pressure 60 is contained within the WSI 55 and PSD 47. The PSD 47 is subjected to the tire pressure 60. With the PSD 47 in place, it is a gastight configuration even before attaching the retaining nut 61. A protective valve cap 65 is fitted on the WSI 55.

In FIG. 6 to FIG. 8 (and FIG. 9 to FIG. 10 as well relating to the alternative embodiment set forth below), the dotted areas are the areas connected to the tire pressure 60. Regarding interfaces between detachable parts like the PSD 47, the usual means for sealing against pressure loss are applied, like O-rings 97 (cf. FIG. 10), even if not explicitly mentioned.

When the WSI 55 only is fitted on a wheel 48, inner valve 59 is closed. The tire pressure 60 is maintained. The WSI 55 is screwed into the wheel 48 rim in place of the original inflation valve. It features the same thread.

When the PSD 47 is slid onto the WSI 55 (FIG. 7), nothing happens. The PSD 47 is in place but is not connected to the tire pressure 60. When the retaining nut 61 is screwed on the WSI 55, a design feature of the retaining nut 61 pushes on the inner valve 59 and opens it. Tire pressure 60 flows through inner valve 59. Outer valve 63 remains closed. Outer valve 63 would open if an inflation means was connected to the retaining nut 61.

The thread 99 on the free end of the retaining nut 61 features the exactly same interface (thread and thread length) as the original inflation valve. The PSD 47 is free to rotate around the PSH 57 until the retaining nut 61 is tightened. The orientation of the PSD 47 around the PSH 57 does not matter. A circumferential groove 100 in either the PSH 57 or the PSD 47 (or both) allows the PSD 47 to be subjected to tire pressure 60 whatever its orientation may be. By this means, the PSD 47 may be fixed in any rotational position on PSH 57 with maintaining a fluidic connection between the gas under pressure 60 and the PSD 47, in particular its pressure transducer 83.

A standard valve cap 65, same as the one of the original inflation valve, screws onto the thread 99 of the free end of the retaining nut 61. It protects the valves 59, 63 from contamination (e.g. water, dust, etc.). Therefore, the thread 99 is exactly the same as that of the original inflation valve, or is at last compatible therewith so that accessories like the cap 65 can be attached to the free end of the retaining nut 61 as to the original inflation valve.

Alternative Embodiment: One Single Valve

The previously described solution with two valves in series meets all expectations, although it is fairly complex and costly to manufacture. A second variant has been designed and tested that achieves the same functions with a simpler design: An inner valve is omitted, and the retaining nut 61 becomes simpler. This results in a PSH 57 that is cheaper, lighter, more compact and more reliable (because it contains less parts).

The function fulfilled by inner valve 1 (retaining tire pressure during PSD 47 replacement) is fulfilled by the very small size of the hole 69 that directs the pressure from the inside of the WSI 55 to the PSD 47. When the PSD 47 is removed, the tire gas flows freely to the atmosphere and the tire deflates. However, since the hole 69 in the WSI 55 is very small, the gas flow is also small. Hence the operator has ample time to remove and re-install a PSD 47 before the tire deflation becomes problematic. A novelty resides in the combination with outer valve 63 that allows connecting an inflation means and inflating the tire.

Conservative calculations show that a hole diameter of 0.25 mm to 0.5 mm achieves the required performance. Such a hole size leads to a decrease of tire pressure of only 2 PSI (138 hPa, i.e. about 150 hPa) after more than 30 s. This is in line with maintenance procedures and tire limitations and leaves enough time for the operator to replace the PSD 47. More generally, a value of at most 2000 hPa, preferably at most 500 hPa, or more preferably at most 300 hPa loss of gas pressure within 30 s may be acceptable.

The WSI 55 is screwed into the wheel 48 rim in place of the original inflation valve. It features the same thread. When the PSD 47 is slid onto the WSI 55, the PSD 47 is subjected to tire pressure 60 and the tire gas no more leaks into the atmosphere. The tire does not deflate anymore.

The retaining nut 61 is screwed on the WSI 55 for securing the PSD 47 in its position. In this single-valve design solution, the retaining nut 61 actually is a simple nut. (Outer) valve 63 remains closed. Valve 63 would open if an inflation means was connected to the retaining nut 61. The thread 99 on the free end of the PSH 57 features exactly the same interface (thread and thread length) as the original inflation valve. The general considerations for thread 99 set forth above in the preceding embodiment apply as well. The PSD 47 is free to rotate around the PSH 57 until the retaining nut 61 is tightened. The orientation of the PSD 47 on the PSH 57 does not matter. A circumferential groove 100 in either the PSH 57 or the PSD 47 or both allows the PSD 47 to be subjected to tire pressure 60 whatever its orientation is.

A standard valve cap 65, same as the one of the original inflation valve, screws onto thread 99 of the free end of the retaining nut 61. It protects the valve 63 from contamination (e.g. water, dust, etc.).

Common Features of the Valve Arrangements

Both designs (two valves in series or one single valve) fulfil the four main functions:
Maintain the PSD 47 in place on the tire inflation port
Connect the tire gas pressure to the pressure transducer
Provide a mean to inflate/deflate the tire with the PSD 47 in place
Allow the PSD 47 replacement with the tire inflated (Ultra-)Low-Power Storage Mode of Tire Pressure Measurement Device The means to put the PSD 47 in low-power mode is based on a magnetic switch circuitry 75 containing a reed switch 76 and lock-on circuit 77 for locking the entire circuit in the powered-on-state.

The purpose of the magnetic switch circuitry 75 is to change state when a magnetic field is applied or removed, in order to switch off the device and increase the life of battery 103. The presence of a magnetic field can only be ensured during the storage (controlled environment) and not during the operation, hence the storage mode occurs when the magnetic field is applied. Consequently the normal operating mode occurs when the magnetic field is removed.

The magnetic switch can be one of:
A normally closed reed switch that opens when a magnetic field is applied.
A normally open reed switch that closes when a magnetic field is applied, integrated within a circuitry 75 that inverts the effect (i.e. open-circuit when the magnetic field is applied). This solution may be preferred since a normally open reed switch may be more reliable than the normally closed ones.

The most convenient way to apply a magnetic field is a magnet 73. A magnet 73 is included in the device shipping package, at a precise location and orientation, in order to maintain it in storage mode. Once the device is removed from its package, it automatically turns on. If it is put back into its package, it turns back off.

The magnetic switch 76 is located just underneath the device housing 105, so that the magnetic field generated by the magnet 76 located close to the device operate the magnetic switch 76. The housing is transparent to magnetic fields, or is at least sufficient permeable for a magnetic field that the magnetic switch can be operated by a magnet located adjacent to the housing 105.

Figure 13:
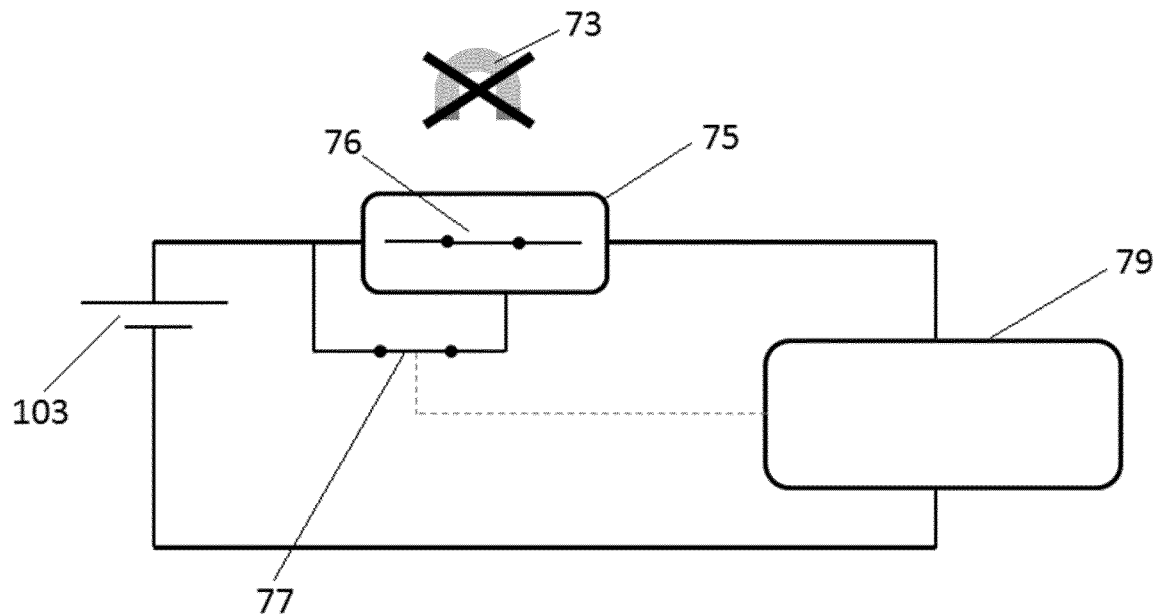
FIG. 13: as FIG. 11, after activation, i.e. permanently activated ("normal operating mode"): The device is removed from its packaging, hence it is distant from the magnet 73. The reed switch 76 has changed its state, and the magnetic switch circuitry 75 has been closed. Therefore the device is turned on. On top of that, the software-controlled lock-on circuit 77 is closed by software running on the now powered electronics 79. Therefore, the device will remain in the powered-on-state even if the magnetic switch circuitry 75 changes state, e.g. by a failure of the reed switch 76 or some magnet moved closed to the device.
Figure 14:
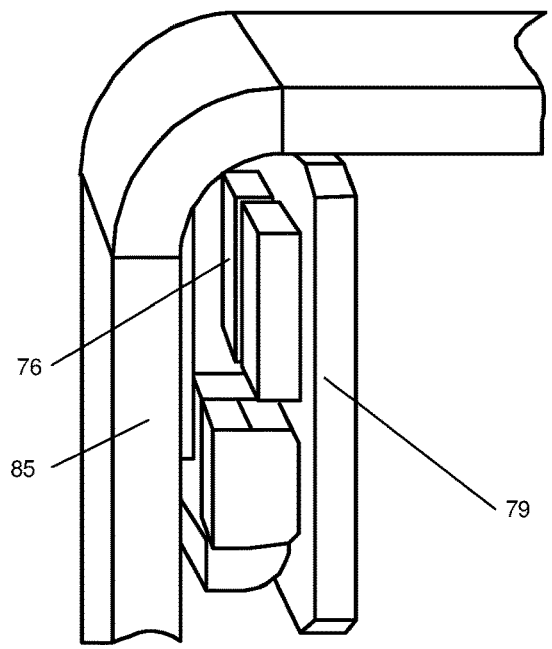
FIG. 14: A schematized partial spatial view of a device with the housing opened.

FIG. 13 shows the state with the device removed from its package so that the magnet 72 is removed. Therefore the magnetic switch circuitry 75 is closed and hence the device is powered on. The magnetic switch circuitry locking means 77 is still open, which means that the device is not locked in operating mode. If the device went to encounter an unwanted magnetic field or if the magnetic switch 76 had a mechanical failure, the device could revert back to ultra-low-power mode.

When the device is installed on an aircraft, it is configured by the user via an app (software) running on a PED 1. Once this configuration is entered, the device knows that it is installed on a wheel 48. When the configuration is entered, the software residing in the electronics 79 of the device commands a transistor (or another switching component, e.g. an electronic switch). This transistor closes a circuit 77 that locks the device in power-on state. When this lock-on circuit 77 is closed, the state of the reed switch 76 (open or closed) does not matter. The device remains powered even if the reed switch 76 changes state. This feature protects the device operation from failures of the reed switch 76. It also prevents the device from being disturbed by unwanted magnetic fields that may be present in the environment.

FIG. 13 illustrates this locken-on status: The device is in operating mode and the magnetic switch circuitry locking means 77 is closed. The magnetic switch circuitry locking means 77 is closed because the software hosted in the electronics 79 commanded an electronic switch (e.g. a transistor) to close. The software commanded this electronic switch to close because it received a configuration command from a user, hence it knows it is installed on aircraft. Since the magnetic switch circuitry locking means 77 is closed, the device is locked in operating mode whatever the state of the magnetic switch circuitry 75. This makes the design robust because the device will not exit operating mode even if it encounters an unwanted magnetic field or if the magnetic switch 76 fails.

If the device configuration is deleted by the user, i.e. the software is put in a state that the device is no more installed on an aircraft, the software stops commanding the transistor and the lock-on circuit 77 opens. Then the magnetic switch circuitry 77 is no more by-passed. This function allows the device to be put back into storage in ultra-low-power mode after a period of operation.

The entire circuitry is designed to minimize leakage currents. In battery-powered devices, small leakage currents can have a significant detrimental impact on the service life. The described embodiment minimizes the leakage currents down to a few nano-Ampere (at most 100 nA, preferably at most 50, 30 20, 10 or even 5 nA with increasing preference).

Figure 15:
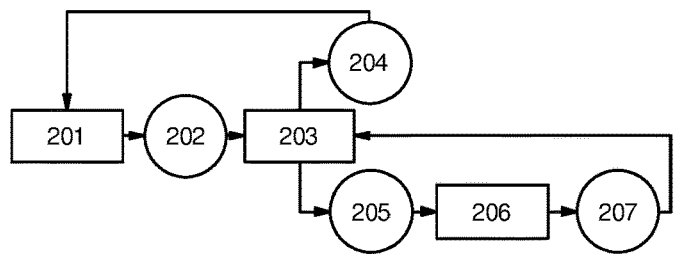
FIG. 15: Flow chart of transition between operational states of the device.
Figure 16:
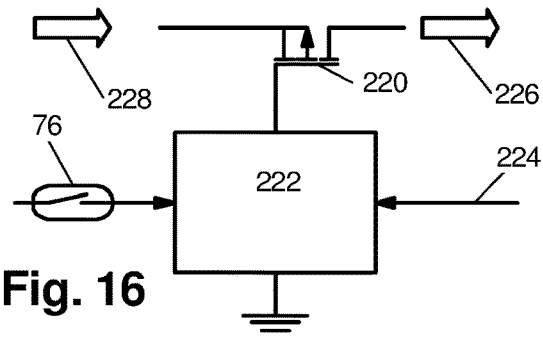
FIGS. 16, 17 Electric circuit schemata

State Flowchart (FIG. 15)

FIG. 15 shows the states of the device and the transitions between states:

201 Magnet is located in immediate proximity of the device, typically when the device rests in its delivery package.

202 Magnet is removed from the immediate proximity of the device, device switches over to state 203.

203 Device is in fully operational mode but may still be subjected to perturbations e.g. due to unwanted magnetic fields as it is not locked in powered mode (locked-on not engaged).

204 Magnet is put in immediate proximity of the device: Device changes back into passive mode (ultra-low power mode).

205 Device is configured by the user via wireless communication: Device moves on to state 206.

206 Device is in fully operational mode and immune from unwanted magnetic fields or magnetic switch failure: locked-on is engaged.

207 Device configuration is erased by the user via wireless communication: Device goes back in state 203.

Electronic Schematic

Figure 11:
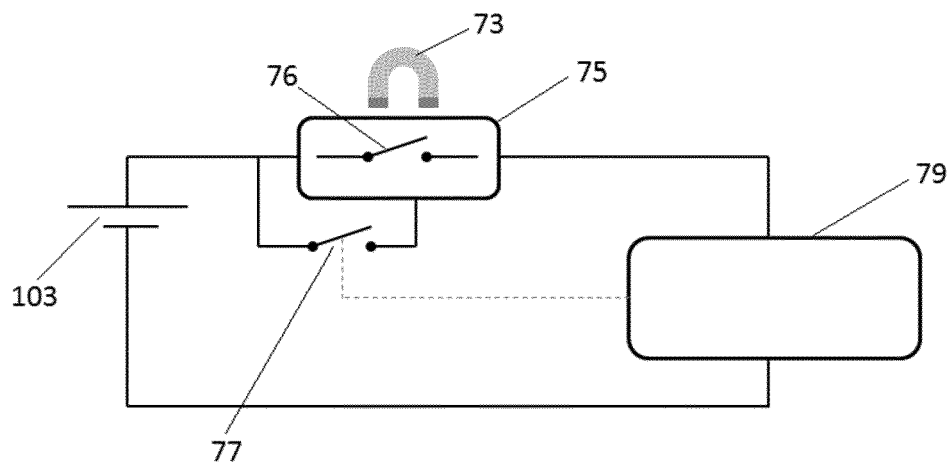
FIG. 11 High-Level scheme of a sensor of increased shelf time in storage mode: A magnet 73 put close to the magnetic switch circuitry 75 generates a magnetic field that operates the reed switch 76. This leads to the magnetic switch circuitry 75 being in open-circuit state. The lock-on circuit 77 is also in open-circuit state. Hence, the device is turned off.
Figure 12:
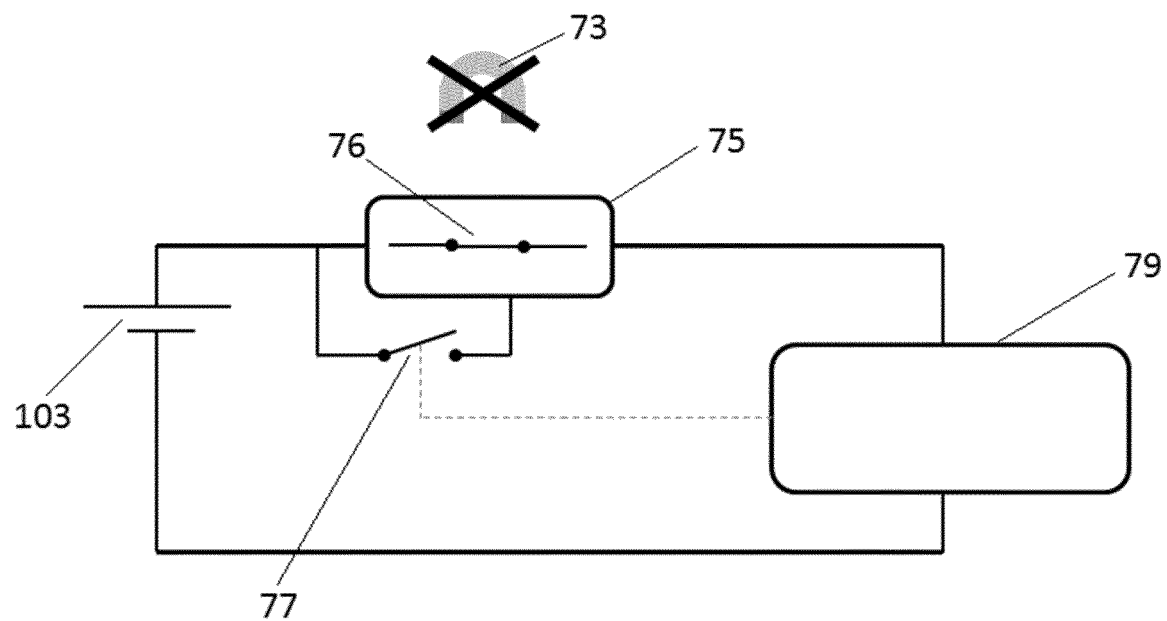

The circuit is implemented using a simple electronic switch 220 (e.g. a transistor) being controlled by an OR'ed command 222 of the magnetic switch 76 and a signal 224 coming from the microcontroller (software-driven, not shown). The "microcontroller" represents the sensor's circuitry designed for measuring the physical property or properties (according to this embodiment, the interior pressure of a tire) and auxiliary functions, like the interface to the PED, and the section deriving the signal 224 from the state of the device. Notably, signal 224 is off or false if the sensor device has not yet been configured, and switches to on or true once the sensor device is configured. The output 226 of the electronic switch 220 is the power supply of the microcontroller. The input 228 of the electronic switch 220 is connected to the power source of the sensor device, in particular a battery. In contrast to FIGS. 11 to 13, the magnetic switch does not directly switch the power, but is connected to the signal of the lock-on logic by means of the OR'd command 222, which supplies the control signal to the electronic power switch 220. Accordingly, the magnetic switch 76 may be optimized in view of sensitivity, but needs not be designed to carry significant current.

The magnetic switch 76 hat its contact open in stand-by condition, i.e. absent a magnet field or exposed to a magnetic field below its switching level (e. g. a normal-open Reed switch). When the magnet is present, i.e. located sufficiently near to the magnetic switch 76 so to create a magnetic field of a strength above switching level of the magnetic switch 76 through it, the magnetic switch 76 is maintained in closed position by the magnetic field. This keeps the electronic switch 220 in open-circuit position.

When the magnet is removed (put further away) the magnetic switch 76 opens, the Or'd command 222 changes the logical level at the control input of the electronic switch 220 from open (interrupt) to closed level and consequently the electronic switch 200 connects the battery to the device electronics, i.e. input 228 with output 226.

The electronic switch 200 is also controlled by a signal 202 coming from the microcontroller on which runs the software for controlling the sensor device, determining the measured value, furnishing the retrieved data to a receiver device, etc.

Figure 17:
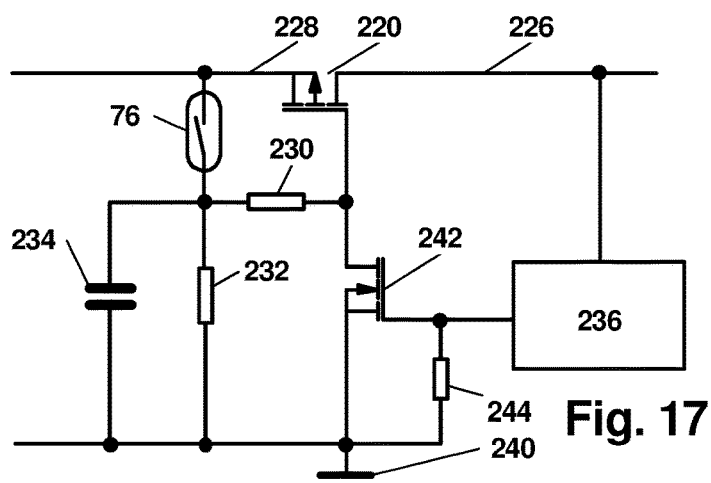

FIG. 17 shows the electronic circuitry more on detail. The magnetic switch is connected to the input 228 and the middle connection of a voltage divider constituted by resistors 230 and 232. The other terminal of resistor 230 is connected to the gate of FET transistor 220 which is the electronic switch, the 2nd terminal of resistor 232 to ground. Capacitor 234 in parallel to resistor 232 suppresses the effect of contact bouncing.

In low-power mode, i.e. with a magnet close to magnetic switch 76 and, therefore, magnetic switch 76 closed, the gate of transistor 220 is connected to its source via resistor 230. Transistor 220 is of the type which constitutes a high resistance, i.e. represents a switch in off state, when its gate is connected to the source, i.e. gate and source are at about the same voltage level.

The current via magnetic switch 76 and resistor 232 is an important factor of the power consumption in low-power state. Given a power supply of some volts, resistor has to be at least 1 M (1 M=$10^6 \Omega$), preferably at least 4 M, 10 M, 20 M, 40 M, or even 100 M with increasing preference.

The "microcontroller" 236 is disconnected form the power source at input 228, hence its output 238 is inactive and mostly at ground potential 240. The gate of transistor 242 would be on ground, too, yet as usual resistor 244 is provided to safely keep the gate at ground potential 240. Transistor 244 is as well a type which is off if its gate is on the same potential as its source.

In order to minimize power consumption, particularly in this switched-off mode, most importantly transistor 220 is a (MOS-)FET, and transistor 244 is a (MOS-)FET as well. Thereby, it is possible to choose high resistance values for resistor 232 through which current flows if magnetic switch 76 is closed.

Once the magnet is removed, switch 76 opens, and the gate of transistor 238 is drawn toward ground potential 240 by resistors 230 and 232 as fast as capacitor 234 is discharged, transistor 220 turns to low resistance equivalent to closing a switch, and microcontroller 236 is powered on. Now, the device is in state 203 (FIG. 15), i.e. active, yet unconfigured. In particular, an automatic reset is preferred which secures a predefined, unconfigured state after power-on.

Configuring (transition 205) entails that microcontroller 236 activates its output 236, hence a high potential is applied to the gate of transistor 242. Transistor 242 gets low resistance and shortcuts resistors 230, 232, corresponding to state 206. In this state, activating magnetic switch 76 by a magnetic field will not have any effect on the state of transistor 220, hence the sensor device is locked in the on-state or powered state.

Configuration may be any useful entry, starting with only entering a datum meaning that the device has to remain on. Other useful data are status indication that the sensor is attached to a plane, indications to which tire of which wheel of a plane it is attached, and other data. These date may be permanently stored in a memory comprised in the sensor (not shown), more particularly in the microcontroller, so that the microcontroller can access it.

Removing these data, i.e. resetting the microcontroller 236 substantially to the configuration it has immediately after powering-on, is detected by the microcontroller 236 and causes the inactivation of its output 238 (transition 207). The gate of transistor 242 is drawn to ground potential 240 again, transistor 242 gets non-conductive, and the system is back in state 203 where it is no more locked in the on-state. By approaching a magnet, e.g. by putting the sensor back in its packaging provided with a magnet in the proper place, the sensor can be deactivated one again, i.e. switched back into (ultra-)low power mode (state 201).

The main advantage of the described embodiment is that no specific equipment is required to activate or de-activate the device. This is important because the first field of application of the invention is aviation. Aircrafts, and in particular business aircrafts, may land in remote airfields where very few equipment is available. Furthermore, commercial aircraft operators cannot manage the burden of having a bespoke equipment to generate a signal to activate this pressure sensing device. Commercial aircrafts are flying all around the world and it is not practical and not economical (and not environmentally friendly either) to make such bespoke equipment available in hundreds of airports. Not requiring specific equipment to activate or de-activate the device is a significant improvement over the prior art. A simple, small, light, inexpensive and commonly available magnet is sufficient to de-activate the device if located and oriented reasonable precisely. Such a magnet may be included in the packaging of the device. Moreover, the magnet is used to de-activate the device. The absence of a magnet leading to the device being activated, no equipment at all is required to activate the device. This makes usage convenient even in a remote location where specific equipment is not available.

From the description of preferred embodiments, the one skilled in the art may derive numerous variants and alternations without leaving the scope of protection which is defined by the claims. Conceivable is, for example:

The invention is used on other vehicles than aircrafts.

The range of the wireless communication between sensor and PED is at least 5 m, preferably at least 10 m, and more preferably at least 15 m, so that the sensor data can be retrieved without the need to closely approach the sensor which may be inconvenient or difficult due to the position where the sensor is mounted on the vehicle.

The range of this wireless communication sensor/PED may be at most 100 m, preferably at most 50 m in order to reduce the risk of contacting other sensors, in particular sensors of other vehicles.

The PED is a portable device like a smart-phone, tablet, portable computer or the like, which are common work accessories, and is capable to execute the software needed to execute the method according to the invention.

Gas for inflating a tire may be air or any other gas known in the art for this purpose.

The PSD may not be provided with an integrated wireless communication unit, but be connected to a wireless communication unit arranged elsewhere in the vehicle.

Instead of a circular symmetry of the interface between PSD and PSH, a regular polygonal interface is provided allowing to mount the PSD in a number of predefined orientation on the PSH. The polygon may be a triangle, a square, a pentagon, a hexagon, etc. allowing 3, 4, 5, 6, or more rotational position. Regular means in this context that the edges of the polygons have the same length so that a rotational symmetry of the order of the edges of the polygons results. Conceivable is even to use another cross section of rotary symmetry 2, like a trapezoid, an ellipsis or a stadium shape (rectangle with semicircles on opposite sides), or of higher rotary symmetry, for example 3, 4, 6, 8.

Further Definitions of the Innovation are Given in Appendix A

| Glossary | |
|---|---|
| A/C | Aircraft |
| FET | field effect transistor |
| GNSS | Global navigating satellite system (GPS, Glonass, Galileo) |
| GPS | the "Global Positioning System" maintained by the U.S. Air Force; also used as a generic designation of GNSSs |
| hPa | hecto pascal; 1 hPa = 100 Pa |
| PED | Portable Electronic Device. Preferably a device which is sufficiently light and small to be carried along by a person as a personal apparel. |
| PSD | Pressure Sensing Device |
| PSH | Pressure Sensor Holder |
| TPMS | Tire pressure measurement system |
| WSI | Wheel-Sensor Interface |
| WTPG | Wireless Tire Pressure Gauge, a tire pressure measurement device featuring wireless communication |

APPENDIX A

Aspects of Described Objects and Methods

1. A method for determining a property of a vehicle, in particular an aircraft, the property being computed from at least one first parameter and at least one second parameter, the 1st parameter being determined on the vehicle itself, characterized in that at least one of the 1st parameters is determined by a 1st sensor (47) arranged on the vehicle, the sensor being provided with or connected to a wireless communication unit, or both;

the 1st sensor transmits the at least one 1st parameter wirelessly to an evaluation device provided with a wireless communication unit arranged for the transmission of the at least one first parameter;

the evaluation device (1) retrieves the at least one 2nd parameter; and the evaluation device (1) computes the property using the at least one 1st parameter and the at least one 2nd parameter.

2. The method according to item 1, characterized in that at least one of the 2nd parameters, preferably all of the 2nd parameters, is retrieved from at least one of the following sources:

a built-in 2nd sensor (5) of the evaluation device;

a device of the vehicle arranged to communicate wirelessly with the evaluation device (1);

from a remote installation providing data, preferably a private database or the public internet, by a communication unit, preferably a wireless communication unit, of the evaluation device.
3. The method according to one of items 1 to 2, characterized in that the evaluation device (1) is a device portable by a person, preferably provided with a display means for showing the value of the property to be determined to a person, and provided with a wireless communication unit for retrieving a 2nd parameter.
4. The method according to one of items 1 to 3, characterized in that the 2nd parameters are retrieved substantially simultaneously with the 1st parameter, in particular while the evaluation device is in the range of the wireless communication unit of the 1st sensor, or before or after the reception of at least one value of the at least one first parameter.
5. The method according to one of items 1 to 4, characterized in that at least one of the 2nd parameters pertains to a location remote to the location of the vehicle so that the property is calculated as if the vehicle was at the remote location.
6. The method according to one of items 1 to 5, characterized in that the property is the relative tire pressure of at least one wheel of the vehicle, at least one 1st parameter being the absolute pressure of the tire and at least one 2nd parameter being the atmospheric pressure.
7. The method according to one of items 1 to 6, characterized in that the vehicle is an aircraft, preferably an aircraft having wheels (48) provided with gas-inflated tires.
8. The method according to one of items 1 to 7, characterized in that the range of the wireless communication between 1st sensor (47) and the evaluation device (1) is limited by at least a lower limit of 5 m, preferably 10 m, more preferably at least 15 m, and optionally by an upper limit of 100 m and preferably of 50 m.
9. A sensor assembly providing pressure values of a gas-inflated tire of a wheel (48), preferably a tire (48) of an aircraft, for use in the method according to one of items 1 to 8, characterized in that the sensor assembly comprises a gas pressure sensor unit (47) comprising a gas pressure sensor (83), wherein the gas pressure sensor unit is arranged to be inserted between the valve seat of the wheel (48) and a valve (63), and that the gas pressure sensor unit is contained in a gastight housing (85) except optionally an access for gas to the gas pressure sensor so that the gas pressure sensor unit is protected from entry of matter from the environment prone to impair its functioning.
10. The sensor assembly according to item 9, characterized in that it comprises an adapter (55) arranged to be attached to a wheel (48) provided with an original valve in a valve seat in place of this valve, wherein the adapter is provided with a valve (63), so that the interior of the adapter has access to the pressurized interior (60) of the wheel, and wherein the adapter comprises an interface surface shaped the way that the gas pressure sensor unit (47) can be attached to the adapter on the interface surface in a gastight manner.
11. The sensor assembly according to item 10, characterized in that the adapter (55) is provided with a hole (69) within the interface surface, so that pressurized gas (60) is available at the interface surface, the interface surface being shaped having a circularly cylindrical cross-section or a cross-section having a rotational symmetry of an order of at least 2, preferably being a regular polygon, and in that at least one of adapter and gas pressure unit is provided in the interface surface with at least one of
 a circumferential groove (100) at the location of the hole, the gas pressure sensor (83) being arranged that it has access to the groove when the gas pressure sensor unit (47) is mounted on the adapter; and
at least one of
 more than one hole (69) in the interface surface of the adapter; and
 more than one access opening of the gas pressure sensor in the interface surface of the gas pressure sensor unit (47);
so that the gas pressure sensor unit (47) can be mounted in at least three rotationally differing positions on the adapter with maintaining a fluidic connection between the hole in the adapter and the gas pressure sensor
via the groove or
by an alignment of one of the holes in the interface surface in the adapter and one of access openings of the gas pressure sensor.
12. The sensor assembly according to item 11, characterized in that the hole has a maximal gas permeability so that the volume of gas that flows through during a prescribed maximal time required to replace the sensor unit (47) with the aircraft resting on its wheels is below a predetermined limit which if exceeded leads to a tire pressure loss that requires a maintenance activity on the wheel and/or tire, preferably maximally a pressure loss in 30 s of at most 2000 hPa, preferably at most 500 hPa and most preferably at most 300 hPa.
13. The sensor assembly according to one of items 9 to 12, characterized in that the pressure sensor unit (47) is provided with a wireless communication section, preferably of a standardized type, more preferably a Bluetooth communication section, so that the measured gas pressure values can be transmitted to a distant device (1) in range of the wireless communication unit.
14. The sensor assembly according to one of items 9 to 13, characterized in that it comprises an electronic circuitry (79) comprising the gas pressure sensor, an exhaustable power source (103), in particular a battery, and a first (75) and a second (77) switch means functionally arranged in parallel and between the circuitry and the power source, wherein the first switch means is controllable from outside the gas pressure sensor unit (47), preferably by means of a field, more preferably a magnetic field, and that the 2nd switch means is controllable by the circuitry, so that starting with a storage mode where both switch means are open, the 1st switch can be closed from outside the gas pressure sensor unit, and the powered circuitry activates the 2nd switch means so that reopening the 1st switch means does not interrupt the connection between power source and circuitry.
15. The sensor assembly according to item 14, characterized in that the presence of a source of the field, preferably a magnet, within a minimal distance keeps the 1st switch unit electrically open, the 1st switch being designed to close electrically in the absence of the field.

The invention claimed is:
1. A sensor assembly providing values of a physical property of a vehicle, comprising an electronic circuitry comprising a sensor suited to sense the physical property and a locking arrangement, and further an exhaustable power source, and a first and a second switch means functionally arranged in parallel and between the circuitry and the power source, wherein the first switch means is controllable from outside the sensor assembly, preferably by means of a field, and that the 2nd switch means is controllable by the locking arrangement, so that starting with a storage mode where both switch means are open, the 1st switch is closable from outside the sensor assembly, and the locking arrangement powered-on thereby is capable to activate the 2nd switch means so that reopening the 1st switch means is no more capable to interrupt the connection between power source and circuitry.

2. The sensor assembly according to claim 1, wherein the 1st switch means comprises a switch element sensitive to the field which is configured to close electrically in the presence of a source of the field, and configured to be open in the absence of the field.

3. The sensor assembly according to claim 2, wherein the source of the field is a magnet.

4. The sensor assembly according to claim 1, wherein the 1st switch means comprises a mechanical switch element comprising at least one moveable contact member which is sensible to a magnetic field so that the switch element is closable and openable by a magnetic field penetrating the mechanical switch element.

5. The sensor assembly according to claim 4, wherein the mechanical switch element is a Reed switch.

6. The sensor assembly according to claim 1, wherein 1st and 2nd switch means comprise in common a 3rd switch element and a logical OR unit having at least two inputs and an output, one input is assigned to theist switch means and the other input being assigned to the second switch means, and the output is functionally connected to a control input of the 3rd switch element, wherein the 3rd switch element is arranged that by closing the 3rd switch element the power supply is connected to the electronic circuitry of the sensor assembly.

7. The sensor assembly according to claim 6, wherein the 3rd switch element comprises a FET transistor having a gate, a source and a drain terminal, and is preferably of the kind, which has a high resistance between source and drain with the gate about on source voltage level.

8. The sensor assembly according to claim 7, wherein:
the electronic circuitry comprises a supply voltage input terminal and a ground input terminal (240) for supplying power to the electronic circuitry;
the exhaustable power source comprises a supply voltage output terminal and a ground connector;
the 3rd switch means comprises a first FET (field effect transistor) having a gate as control terminal, and drain and source, the first FET being of the type to have high resistance with the gate near or on the same potential as the source, and source and drain being connected to one of the pairs supply voltage terminals or ground terminals of the electronic circuit and the power source;
the 1st switch means comprises, each time having a first and a second terminal,
   a switch capable to be switched on and off by presence or absence of a magnetic field,
   a 1st and a 2nd resistor, wherein switch, first and second resistor are connected by the first terminal, the second terminal of the switch being connected to the source of the 1st FET, the 2nd terminal of the 1st resistor being connected to the ground output terminal of the power source, and the second terminal of the second resistor being connected to the gate of the first FET;
a second switch means having a control terminal and two working terminals, the resistance between the working terminals being switchable from high resistance to low resistance by the control terminal, a working terminal being connected to the gate of theist FET, the other working terminal being connected to the ground output terminal of the power source; and
the locking arrangement having an output connected to the control terminal of the second switch means.

9. The assembly according to claim 8, wherein the 1st resistor has a resistance of at least 4 MΩ, wherein 1 MΩ=$10^6$Ω.

10. The sensor assembly according to claim 8, wherein the second switch means is a transistor.

11. The sensor assembly according to claim 8, wherein the second switch means is a FET.

12. The assembly according to claim 8, wherein the 1st resistor has a resistance of at least 10 MΩ.

13. The assembly according to claim 8, wherein the 1st resistor has a resistance of at least 20 MΩ.

14. The assembly according to claim 8, wherein the 1st resistor has a resistance of at least 40 MΩ.

15. The sensor assembly according to claim 1, wherein the powered circuitry is capable to be switched between an unconfigured state and a configured state, with the locking arrangement keeping the 2nd switch means closed in the configured state and keeping the 2nd switch open in the unconfigured state to permit interruption of power to the circuitry by opening the 1st switch provided the circuitry is in the unconfigured state.

16. The sensor assembly according to claim 15, wherein the sensor assembly comprises a storage unit to store configuration data and a reset unit which establishes the unconfigured state of configuration data.

17. A sensor assembly according to claim 1, wherein the sensor assembly comprises a gas pressure sensor unit comprising a gas pressure sensor, wherein the gas pressure sensor unit is arranged to be inserted between the valve seat of the wheel and a valve, and that the gas pressure sensor unit is contained in a gastight housing except optionally an access for gas to the gas pressure sensor so that the gas pressure sensor unit is protected from entry of matter from the environment prone to impair the gas pressure sensor unit's functioning.

18. The sensor assembly according to claim 1, further comprises an adapter arranged to be attached to a wheel provided with an original valve in a valve seat in place of this valve, wherein the adapter is provided with a valve, so that the interior of the adapter has access to the pressurized interior of the wheel, and wherein the adapter comprises an interface surface shaped to attach to the gas pressure sensor unit in a gastight manner.

19. The sensor assembly according to claim 1, wherein the adapter is provided with a hole within the interface surface, so that pressurized gas is available at the interface surface, the interface surface being shaped having a circularly cylindrical cross-section or a cross-section having a rotational symmetry of an order of at least 2, and in that at least one of adapter and gas pressure unit is provided in the interface surface with at least one of
   a circumferential groove at the location of the hole, the gas pressure sensor being arranged to have access to the groove when the gas pressure sensor unit is mounted on the adapter; and
   at least one of
      more than one hole in the interface surface of the adapter; and more than one access opening of the gas pressure sensor in the interface surface of the gas pressure sensor unit;

wherein the gas pressure sensor unit is mountable in at least three rotationally differing positions on the adapter with maintaining a fluidic connection between the hole in the adapter and the gas pressure sensor via the groove or by an alignment of one of the holes in the interface surface in the adapter and one of access openings of the gas pressure sensor.

20. The sensor assembly according to claim 19, wherein the a cross-section having a rotational symmetry of an order of at least 2 is a regular polygon.

21. The sensor assembly according to claim 1, wherein the pressure sensor unit is provided with a wireless communication section to transmit the measured gas pressure values to a distant device in range of the wireless communication unit.

22. The sensor assembly according to claim 21, wherein the wireless communication section is a Bluetooth communication section.

23. A sensor shipment set comprising the sensor assembly according to claim 1, further comprises a packaging shaped to receive the sensor assembly and comprising a magnet with a magnetic field positioned to toggle the 1st switch means if the sensor assembly is positioned in the packaging.

24. The sensor shipment set according to claim 23, wherein the packaging is arranged to receive the sensor assembly in a predefined position where the magnet is in the position to toggle the 1st switch means.

25. The sensor assembly according to claim 1, wherein the physical property of the vehicle is a pressure value of a gas-inflated tire of an aircraft.

26. The sensor assembly according to claim 1, wherein the field is a magnetic field.

* * * * *